United States Patent
Shimizu

(10) Patent No.: US 10,811,891 B2
(45) Date of Patent: Oct. 20, 2020

(54) POWER SUPPLY APPARATUS, METHOD OF CONTROLLING SAME, AND IMAGE READING APPARATUS

(71) Applicant: CANON KABUSHIKI KAISHA, Tokyo (JP)

(72) Inventor: Yuu Shimizu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/526,008

(22) Filed: Jul. 30, 2019

(65) Prior Publication Data

US 2020/0044471 A1 Feb. 6, 2020

(30) Foreign Application Priority Data

Aug. 1, 2018 (JP) .................................. 2018-145418
Mar. 28, 2019 (JP) .................................. 2019-062884

(51) Int. Cl.
*H04N 1/00* (2006.01)
*H02J 7/00* (2006.01)
*H02J 7/34* (2006.01)

(52) U.S. Cl.
CPC ............ *H02J 7/0063* (2013.01); *H02J 7/007* (2013.01); *H02J 7/0021* (2013.01); *H04N 1/00896* (2013.01); *H04N 1/00899* (2013.01); *H04N 1/00901* (2013.01); *H04N 1/00907* (2013.01); *H02J 7/345* (2013.01); *H02J 2007/0067* (2013.01)

(58) Field of Classification Search
CPC ........... H04N 1/00896; H04N 1/00899; H04N 1/00901; H04N 1/00904; H04N 1/00907; H04N 1/00885; H04N 1/00888; H02J 2007/0067; H02J 7/0021; H02J 7/0063; H02J 7/007; H02J 7/345
USPC ....................................... 358/1.13, 1.14, 446
See application file for complete search history.

(56) References Cited

U.S. PATENT DOCUMENTS

2006/0051121 A1* 3/2006 Matsusaka ........... G03G 15/205
                                                    399/70
2007/0201076 A1* 8/2007 Ishida ................ G03G 15/5004
                                                    358/1.14
2016/0337539 A1* 11/2016 Masuda ................... H02M 7/06

FOREIGN PATENT DOCUMENTS

JP          2018-069617 A         5/2018
JP           2018069617 A    *    5/2018

* cited by examiner

*Primary Examiner* — Chad Dickerson
(74) *Attorney, Agent, or Firm* — Venable LLP

(57) ABSTRACT

An object of the present disclosure is to perform discharge control that suppresses deterioration in power storage performance of a power storage component by taking the state of power supply equipment into consideration. A power supply apparatus comprises: a power storage unit that stores electric charges from an external power supply; a control unit that controls charge and discharge of the power storage unit; a state determination unit that determines the power supply state of the external power supply; and a voltage detection unit that detects the voltage at the power storage unit. The control unit performs first discharge control to lower the voltage at the power storage unit to a smaller second voltage value if a predetermined time elapses since the completion of drive of a drive unit and the state determination unit determines that the power supply state is not a state of restricting power to be supplied.

12 Claims, 3 Drawing Sheets

POWER SUPPLY APPARATUS, METHOD OF CONTROLLING SAME, AND IMAGE READING APPARATUS

BACKGROUND OF THE INVENTION

Field of the Invention

The technique of the present disclosure relates to a technique for controlling discharge of a power storage element.

Description of the Related Art

There are pieces of equipment that comprise a power storage element such as an electric double-layer capacitor (EDLC) and discharge electric charges stored in the power storage element as auxiliary power to raise the peak output of a main power supply to implement high-output drive of a motor or rapid heating of a heater. Such equipment uses power supplied from a PC through a USB cable as a main power supply but also stores electric charges in the EDLC in advance, and in a case where power above the main power supply is needed, discharges the stored electric charges to supply auxiliary power. This enables high output or a stable operation. Also, during standby, during which high power is not needed, the equipment fully charges the EDLC so that the EDLC can quickly supply power in the next operation.

Meanwhile, it is known that keeping an EDLC in a fully charged state for a long time reduces its charge capacity. As a countermeasure against this reduction in capacity, a method has been proposed in which some of stored electric charges are discharged in a case where no operation has been performed for a while and electric charges do not need to be supplied. Japanese Patent Laid-Open No. 2018-069617 discloses a method in which power supply performance is detected and the amount of discharge of an EDLC is adjusted according to the detected supply performance, in order to achieve both shortening of the charge wait time and suppression of deterioration of the EDLC. For supplying power through a USB interface (USB bus power), there are various specifications such as USB 2.0, USB 3.0, and USB-TYPE C, and the amount of power to be supplied varies depending on the equipment and cable to which the EDLC is connected. Thus, in a case where the power supply performance is high, the EDLC is charged in a short time and thus all electric charges in the EDLC are discharged in a state where auxiliary power is not needed. On the other hand, in a case where the power supply performance is low, it takes a long time to charge the EDLC and thus not all electric charges are discharged but electric charges are discharged up to an amount that the effect on deterioration of the EDLC is low. In this way, the charge wait time is shortened and deterioration of the EDLC is suppressed.

SUMMARY OF THE INVENTION

For supplying power such as USB bus power, the power supply performance varies depending not only on the specifications of the equipment and the cable but also on the state of the power supply equipment of the moment. However, conventional methods do not take such the state of the power supply equipment into consideration.

A power supply apparatus according to the present disclosure comprises: a power storage unit configured to store electric charges supplied from an external power supply; a control unit configured to control charge and discharge of the power storage unit; a state determination unit configured to determine a power supply state of the external power supply; and a voltage detection unit configured to detect voltage at the power storage unit. The control unit performs first discharge control to lower the voltage at the power storage unit, which has a first voltage value, to a second voltage value smaller than the first voltage value in a case where a predetermined time elapses since completion of drive of a drive unit configured to be driven with power supplied from the power supply apparatus and the state determination unit determines that the power supply state is not a state of restricting power to be supplied.

Further features of the present invention will become apparent from the following description of exemplary embodiments with reference to the attached drawings.

DESCRIPTION OF THE EMBODIMENTS

An embodiment according to the technique of the present disclosure will be described below through an exemplary embodiment with reference to the drawings.

Embodiment 1

The configuration of an image reading apparatus to which the present embodiment is preferably applicable will be described.

Figure 1:
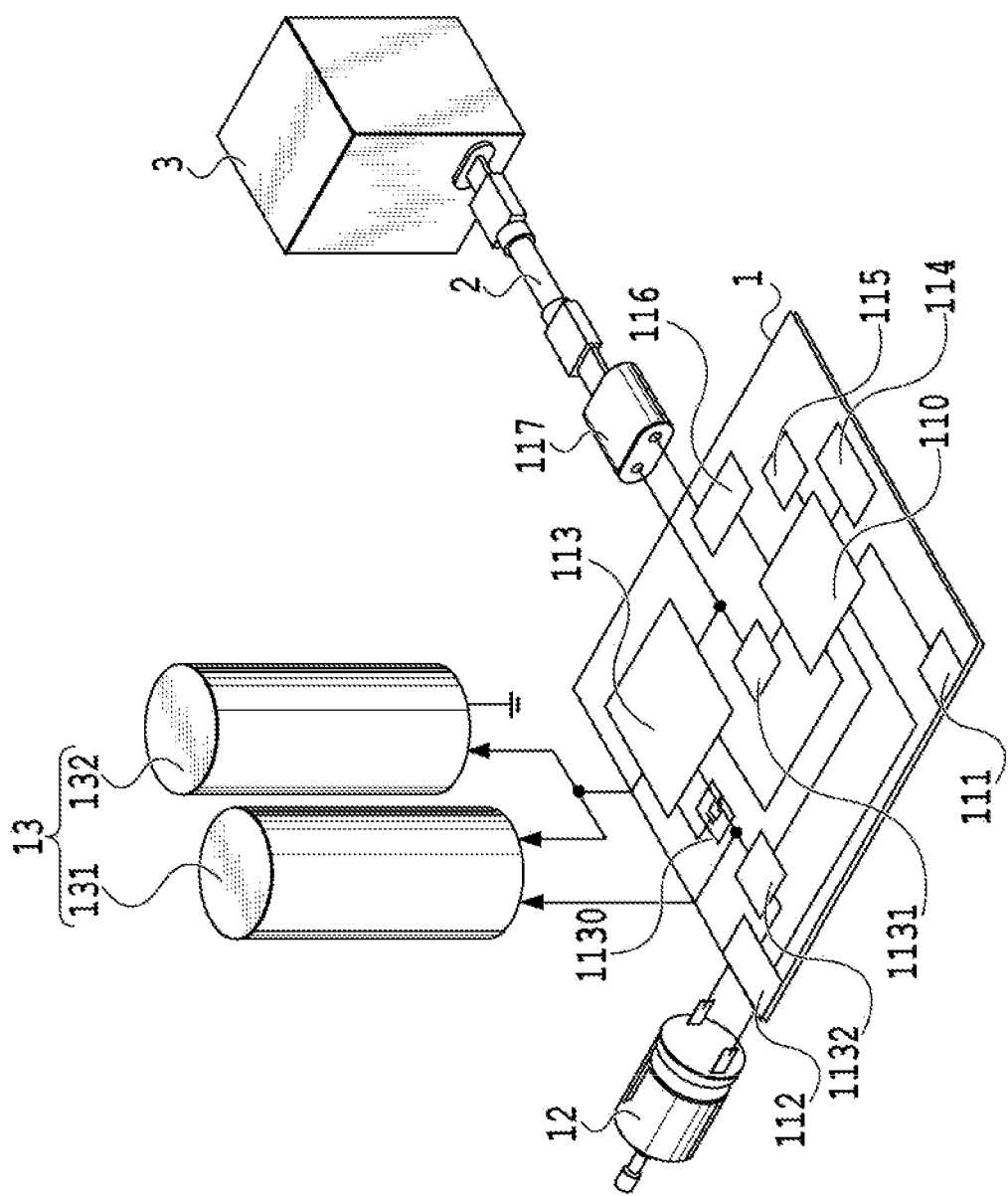
FIG. 1 is a diagram illustrating the hardware configuration of an auxiliary power supply apparatus.

FIG. 1 is a configuration diagram illustrating an image reading apparatus including an auxiliary power supply apparatus 1 to which the technique of the present disclosure is applicable, and an information processing apparatus 3 connected to the image reading apparatus by an external power supply cable 2. Note that in the present embodiment, a description will be given of an example in which the information processing apparatus 3 serves as an external power supply, and power is supplied to the image reading apparatus from the information processing apparatus 3. The auxiliary power supply apparatus 1 is a power supply device and may be a power supply unit equipped with a circuit equivalent to a power supply device. The auxiliary power supply apparatus 1 is mainly divided into: a system unit mainly configured of a CPU 110; a drive unit 12; and a power storage unit mainly configured of an auxiliary power supply control circuit 113. Note that in the present embodiment, the drive unit 12 is equipped with an image reading sensor (not illustrated) that optically reads a document. Specifically, the image reading sensor is driven by the drive unit 12. Details of the drive unit 12 will be described later.

The CPU 110 is a processor that performs calculation for control and drive of the entire auxiliary power supply apparatus 1. The CPU 110 is a device chip but may be a system processing block incorporated in a multi-function chip. The CPU 110 deploys an operating program and setting information for the auxiliary power supply apparatus 1 stored in an ROM 115 into an RAM 114, and controls the auxiliary power supply apparatus 1 in accordance with a control command received from the information processing apparatus 3 through an external power supply connecting unit 117. Also, in accordance with the received command, the CPU 110 issues a drive instruction to a drive control circuit 112 and issues an instruction to charge a power storage unit 13 and an instruction to discharge the power storage unit 13 to the auxiliary power supply control circuit 113.

Further, the CPU 110 receives image data from an image processing unit 111, temporarily stores the image data in the RAM 114, and performs adjustment processing and compression processing on the image data. Furthermore, after performing the adjustment processing and compression processing, the CPU 110 transmits the image data to the information processing apparatus 3 through the external power supply connecting unit 117. The CPU 110 measures time and switches a charge voltage setting as well. Note that the image data obtained by the CPU 110 from the image processing unit 111 is digital data based on a reading signal outputted from the image reading sensor.

Also, the CPU 110 performs time measurement processing by using a program that detects the system clock of the CPU 110 and calculates time from the detected clock value. Further, the CPU 110 executes charge voltage setting switch processing. Specifically, first, the CPU 110 writes a charge voltage setting value to the RAM 114. For example, the charge voltage setting value of the auxiliary power supply apparatus 1 at an initial setting timing is set at 5 V. Then, the CPU 110 measures time after the completion of an operation of the drive unit 12, and rewrites the charge voltage setting value written in the RAM 114 to 3 V upon the elapse of a set time determined in advance. Along with this rewrite, the CPU 110 issues an instruction to discharge toward the charge voltage setting value written in the RAM 114, i.e., 3 V, to the auxiliary power supply control circuit 113.

The image processing unit 111 corresponds to an analog front end IC. The image processing unit 111 obtains the difference between an input signal from the image reading sensor and a predetermined reference voltage as image signal level. The image processing unit 111 samples and corrects the image signal level, and then converts the result into digital data and transmits the digital data to the CPU 110. Note that the input signal from the image reading sensor corresponds to a reading signal which the image reading sensor generates by receiving light reflected by a document.

The drive control circuit 112 corresponds to a motor driver IC. The drive control circuit 112 transmits a control signal to the drive unit 12 in accordance with a command from the operating program executed by the CPU 110, and controls movement of the drive unit 12, equipped with the image reading sensor, in the main scanning direction.

The auxiliary power supply control circuit 113 performs charge control and discharge control of the power storage unit 13 (hereinafter also referred to as charge-discharge control). The auxiliary power supply control circuit 113 is a device chip but may be a power supply control block incorporated in a multi-function chip. Upon receipt of an instruction from the CPU 110, the auxiliary power supply control circuit 113 controls the on-off of a supply restriction switch unit 1130 and the drive of a drive unit power supply 1132 such that the charge voltage setting value written in the RAM 114 and the voltage at the power storage unit 13 can be equal to each other. In other words, the auxiliary power supply control circuit 113 performs control to set the voltage value of the power storage unit 13 to the set charge voltage setting value.

The auxiliary power supply control circuit 113 also has the function of detecting the charge voltage for the power storage unit 13 in order to check power which the power storage unit 13 can supply to the drive unit power supply 1132. When the auxiliary power supply control circuit 113 determines that the detected charge voltage for the power storage unit 13 is so low that sufficient power to drive the drive unit 12 cannot be supplied, the auxiliary power supply control circuit 113 stops the supply of auxiliary power to the drive unit power supply 1132 and stands by until the charge voltage recovers to the charge voltage setting value stored in the RAM 114.

The auxiliary power supply control circuit 113 further has the function of controlling the voltages at power storage elements 131 and 132 included in the power storage unit 13 such that an imbalance of the voltages is eliminated. Specifically, the auxiliary power supply control circuit 113 incorporates a comparator, with which the auxiliary power supply control circuit 113 compares the voltage value of an intermediate point between the two power storage elements 131 and 132 with the charge voltage setting value. In a case where the voltage difference of the result of the comparison is not zero and therefore the voltage values of the power storage elements 131 and 132 are not equal to each other, the auxiliary power supply control circuit 113 controls the voltages at the power storage elements 131 and 132 to make the voltages equal to each other.

The supply restriction switch unit 1130 is a switch that switches the connection between the external power supply and each of the power storage unit 13 and the drive unit power supply 1132. The supply restriction switch unit 1130 corresponds to a transistor whose on-off is switched by a voltage applied to its gate. The supply restriction switch unit 1130 is not limited to a single component but may be incorporated in the device. In a case of charging the power storage unit 13 in accordance with a control instruction from the auxiliary power supply control circuit 113, the supply restriction switch unit 1130 is turned on to connect the external power supply and each of the power storage unit 13 and the drive unit power supply 1132. On the other hand, in a case of discharging the power storage unit 13 in accordance with a discharge control instruction from the auxiliary power supply control circuit 113, the supply restriction switch unit 1130 is turned off to terminate the connection between the external power supply and each of the power storage unit 13 and the drive unit power supply 1132. Also, upon detection of overvoltage or overcurrent due to abnormality of the external power supply, the supply restriction switch unit 1130 is turned off to terminate the connection with the power storage unit 13 and the drive unit 12, thereby protecting the power storage unit 13 and the drive unit 12.

A system power supply unit 1131 is a unit that generates power to be supplied to the system unit, such as the CPU 110, the RAM 114, and the ROM 115. The system power supply unit 1131 corresponds to a regulator. It is not limited to a single component but may be incorporated in the device. The voltage supplied by the external power supply is often above 3 V, whereas many logical units of system-on-a-chips and multi-chip modules operate at a voltage of around 3 V or lower. For this reason, the system power supply unit 1131 receives a voltage of a voltage value above 3 V, lowers the received voltage, and supplies the voltage of the low voltage value (below 3 V) to the system unit.

The drive unit power supply 1132 is a part that generates power to be supplied to drive the drive unit 12. It comprises a voltage raising circuit and a set of electric components, and part of its function may be incorporated in the device. The drive unit 12 is often driven at a voltage higher than the voltage from the external power supply. For this reason, the drive unit power supply 1132 receives the external power and power supplied from the power storage unit 13 and raises their voltages in order to supply a voltage with a high voltage value to be used by the drive unit 12.

The RAM 114 is a memory such as a DDR SDRAM. The RAM 114 temporarily stores the operating program for the auxiliary power supply apparatus 1 and image data loaded by the image processing unit 111.

The ROM 115 corresponds to a flash memory, an EEPROM, or the like, but can be an HDD instead. The ROM 115 stores the operating program and setting information for the auxiliary power supply apparatus 1.

An external power supply monitoring unit 116 monitors the current value of the power supplied from the information processing apparatus 3, which functions as an external power supply (power supply source), and the power supply state of the information processing apparatus 3. The external power supply monitoring unit 116 corresponds to a communication IC of an external interface such as an USB interface and may be configured such that its communication function is incorporated in the CPU 110. In the case where the external interface is a USB interface, the external power supply monitoring unit 116 detects bus-power current from a power supply line VBus. Further, the external power supply monitoring unit 116 monitors the power supply state of the information processing apparatus 3, which supplies power, with signal lines D+ and D− of the USB interface. Note that the power supply state of the information processing apparatus 3 is determined on the basis of whether USB packet polling is performed by the information processing apparatus 3. In a case where the information processing apparatus 3 is in an operating state, packet polling is performed regularly. In a case where the information processing apparatus 3 is in a suspend state (powered off state or power saving mode), packet polling is not performed. Thus, the external power supply monitoring unit 116 can determine the state of the information processing apparatus 3 as a suspend state in a case where no packet comes from the information processing apparatus 3 for a predetermined time.

The external power supply connecting unit 117 corresponds to a connector for connection to the external interface. The external power supply connecting unit 117 is used to transfer a control instruction from the information processing apparatus 3 to the auxiliary power supply apparatus 1 and to transfer image data from the image reading apparatus to the information processing apparatus 3.

The drive unit 12 corresponds to a motor and, in the image reading apparatus, is a motor that drives the image reading sensor. In image reading, it drives the image reading sensor in manners corresponding to operating programs. Note that although the present embodiment is being described by taking an image reading apparatus as an example, the present embodiment is similarly applicable to a printer. In the case of a printer, the drive unit 12 may be a motor for driving a carriage which carries an ink head, which is a printing unit, or a motor that drives a sheet feed roller.

The power storage elements 131 and 132 of the power storage unit 13 correspond to EDLCs. The power storage elements 131 and 132 may be capacitor components capable of storing power. At present, for the power storage elements 131 and 132, EDLCs with a rated voltage of 2.5 V have been widespread but there are EDLCs that withstand higher voltages. To set a charge voltage above the rated voltage of each of these power storage elements 131 and 132 in the case of using the power storage elements 131 and 132, it is necessary to connect the power storage elements 131 and 132 in series. For example, for the power storage unit 13 to be configured to support a charge voltage of 5 V, two power storage elements each with a rated voltage of 2.5 V or higher are connected in series to configure the power storage unit 13. The power storage unit 13 receives and stores power from the external power supply under charge control by the auxiliary power supply control circuit 113, and discharges power as auxiliary power to the drive unit 12 under the discharge control by the auxiliary power supply control circuit 113. Note that the discharge control is performed such that the voltage applied to each of the power storage elements does not exceeds the rated voltage, which is 2.5. V.

The external power supply cable 2 corresponds to a USB cable or the like but may be a cable compatible with a different external interface capable of supplying power. Through the external power supply cable 2, power is supplied and also signals and data are transmitted and received to and from the auxiliary power supply apparatus 1.

The information processing apparatus 3, which functions as an external power supply, corresponds to a PC or the like but may be a tablet-type terminal that supplies power through a USB interface or the like. Besides supplying power, the information processing apparatus 3 is capable of transmitting and receiving signals and data to and from the auxiliary power supply apparatus 1 of the image reading apparatus through the external power supply cable 2.

Figure 2:
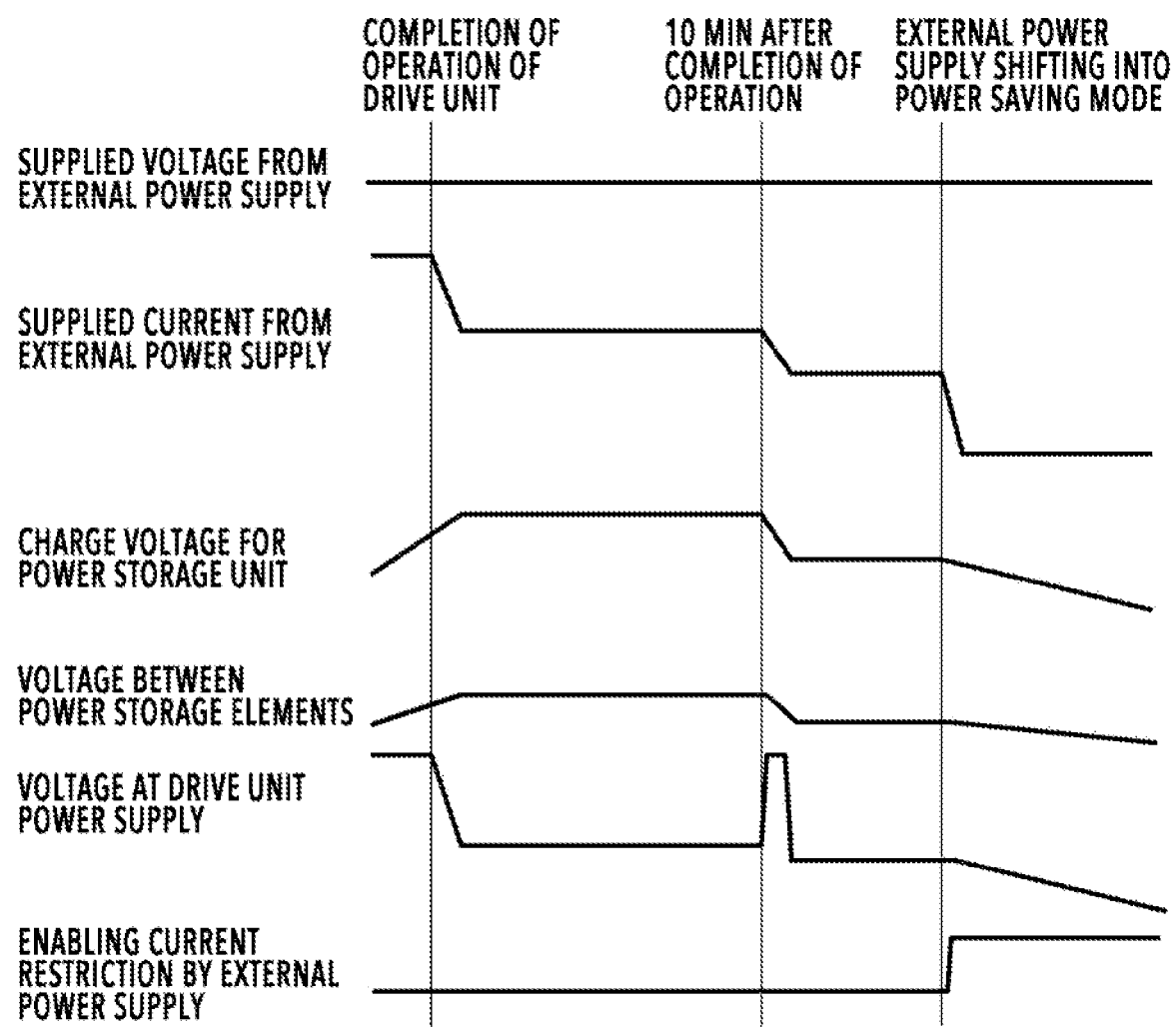
FIG. 2 is an exemplary diagram illustrating changes in voltage and current states until discharge of an auxiliary power supply apparatus according to an embodiment of the technique of the present disclosure.

Next, power control in the present embodiment will be described. FIG. 2 is an exemplary diagram illustrating main changes in voltage and current states along a time axis until discharge of the auxiliary power supply apparatus 1, to which the technique of the present disclosure is applicable.

FIG. 2 illustrates time-series changes in the supplied voltage and current from the external power supply, the charge voltage for the power storage unit 13, the voltage of the intermediate point between the power storage elements 131 and 132, the voltage at the drive unit power supply 1132, and the enabling/disabling of current restriction at the external interface. Meanwhile, FIG. 2 illustrates the changes in the above voltage and current states immediately after the completion of an operation of the drive unit 12.

As illustrated in FIG. 2, immediately after the completion of the operation of the drive unit 12, the supplied voltage from the external power supply remains constant. The supplied current from the external power supply changes due to the load imposed on the drive unit 12 and the charging of the power storage unit 13. While the drive unit 12 is operating, a current of a restricted current value that can be supplied from the external power supply is supplied to the power storage unit 13 to recover the consumed power. Specifically, a current of a restricted current value determined as the maximum value of current to be supplied is supplied. Note that the restricted current value is determined by the supply capacity of the information processing apparatus 3, which is the external power supply. For example, the restricted current value is 500 mA in a case where the information processing apparatus 3 is in an operating state. This information on the supply capacity is obtained from the information processing apparatus 3 by a power supply determination sequence executed in advance by using the signal lines D+ and D−.

As the load on the drive unit 12 decreases after the completion of the operation of the drive unit 12, the current charging the power storage unit 13 exceeds the current discharged from the power storage unit 13. Thus, as the power storage unit 13 gets closer to a fully charged state, the supplied current from the external power supply becomes smaller. After the power storage unit 13 reaches the fully charged state, the amount of current required is an amount enough for the operation of the system unit, such as the CPU 110, and for maintaining the voltage value of the power storage unit 13, so that the supplied current from the external power supply becomes constant. Note that while the drive unit 12 is operating, the electric charges in the power storage unit 13 are discharged to the drive unit power supply 1132. Hence, the voltage at the power storage unit 13 drops from the voltage value in the fully charged state by the amount of power consumed by the operation of the drive unit 12.

As the load on the drive unit 12 decreases after the completion of its operation, the current inputted into the power storage unit 13 for charging increases and exceeds the current outputted from it for discharging, so that the charge voltage recovers toward the voltage value in the fully charged state. The charge voltage for each of the power storage elements, connected in series, is controlled by the auxiliary power supply control circuit 113 to be the value of the charge voltage applied to the power storage unit 13 divided by the number of power storage elements so that an imbalance of the charge voltages of the power storage elements is eliminated. In the present embodiment, the number of power storage elements is two, so that the charge voltage for each of the power storage elements 131 and 132 is controlled to be a half of the charge voltage for the power storage unit 13.

The voltage at the drive unit power supply 1132 is raised during the operation of the drive unit 12, but the voltage drops to the same level as the charge voltage for the power storage unit 13 after the operation is completed. Note that while the drive unit 12 is driven, the restriction on the current from the external power supply (the restriction on the supplied power) is disabled during the operation of the drive unit 12 and also immediately after the completion of the operation. Specifically, in a case where communication is established between the auxiliary power supply apparatus 1 and the external interface of the information processing apparatus 3 and the information processing apparatus 3 is not in a suspend state (the information processing apparatus 3 is in an operating state), power can be stably supplied from the information processing apparatus 3 without the current restriction. In such case, the current restriction is therefore disabled.

First discharge control is performed on the power storage unit 13 in a case where the operation of the drive unit 12 is completed and then a predetermined time (e.g., 10 minutes) elapses with the communication with the external interface maintained and with no new control instruction from the information processing apparatus 3. The first discharge control starts firstly by changing the charge voltage setting value. Secondly, the supply restriction switch unit 1130 is turned off, thereby terminating the connection with the external power supply, and then the drive unit power supply 1132, which is a power supply for the drive unit, generates voltage toward the newly set charge voltage setting value (e.g., 3 V), thereby causing an electrical loss. Furthermore, functions related to control of the image processing unit 111 and the drive unit 12 are disabled, and the RAM 114 is put into a power saving mode. At this moment, the voltage supplied from the external power supply is still remaining constant. On the other hand, the current value of the supplied current from the external power supply decreases since the required power decreases as a result of disabling the system unit's functions. By the first discharge control, the voltage at the power storage unit 13 starts dropping. Here, the voltage at the drive unit power supply 1132 temporarily rises by an amount corresponding to the amount of discharge of the power storage unit 13 by the first discharge control.

The first discharge control is continued such that the voltage at the power storage unit 13 drops to the charge voltage setting value. The first discharge control is stopped once the voltage at the power storage unit 13 reaches the charge voltage setting value, and the voltage at the power storage unit 13 is held at the charge voltage setting value. The voltage between the power storage elements 131 and 132 is controlled by the auxiliary power supply control circuit 113 such that the voltage at each of the power storage elements 131 and 132 is equal to each other and an imbalance of the voltages is eliminated, and is a voltage equal to the newly set charge voltage setting value divided by the number of elements. At this moment, the current restriction of the external power supply is still disabled. In other words, the first discharge control is performed with communication established between the auxiliary power supply apparatus 1 and the external interface of the information processing apparatus 3.

Although a particular elapsed time is not set, in a case where the information processing apparatus 3 is put into a suspend state after the discharge of the power storage unit 13 by the first discharge control, the supplied current from the external power supply gets restricted in response to an instruction to enable the current restriction of the external power supply based on a communication through the external interface. In sum, in a case where the external power supply monitoring unit 116 determines that the information processing apparatus 3 is in a suspend state, the restricted current value of the current supplied from the information processing apparatus 3 is lowered to below the restricted current value supplied in the case where the information processing apparatus 3 is in an operating state. For example, the restricted current value of the information processing apparatus 3 is 500 mA in an operating state, whereas the restricted current value is 2.5 mA in a suspend state. In the case where the supplied current is restricted as above, the auxiliary power supply control circuit 113 performs second discharge control by switching the destination of connection for the power storage unit 13 to a resistance component. Unlike the first discharge control, this second discharge control causes the power storage unit 13 to gradually discharge its electric charges. The functions of the system unit are restricted to the minimal functions necessary for receiving control signals from the external interface, and the other functions are disabled. At this moment too, the supplied voltage from the external power supply remains constant. The current from the external power supply is restricted, and only the minimal power necessary for receiving control signals from the external interface is supplied from the external power supply. Since the electric charges in the power storage unit 13 are discharged through the resistance component connected to the power storage unit 13, the voltage at the power storage unit 13 gradually drops with the elapse of the discharge time. At this timing, the voltage between the power storage elements 131 and 132 is not controlled and gradually drops with the elapse of the discharge time, similarly to the voltage at the power storage unit 13. The voltage at the drive unit power supply 1132 gradually drops with the elapse of the discharge time, similarly to the voltage at the power storage unit 13, in a state where the functions of the drive unit 12 and the drive unit power supply 1132 are disabled.

Note that once the current restriction of the external power supply is enabled, the information processing apparatus 3 is powered on and maintained to be powered on until receiving an instruction of reoperation from the external interface. Meanwhile, the first discharge control and the second discharge control are performed in a state where the drive unit is not driven.

Figure 3:
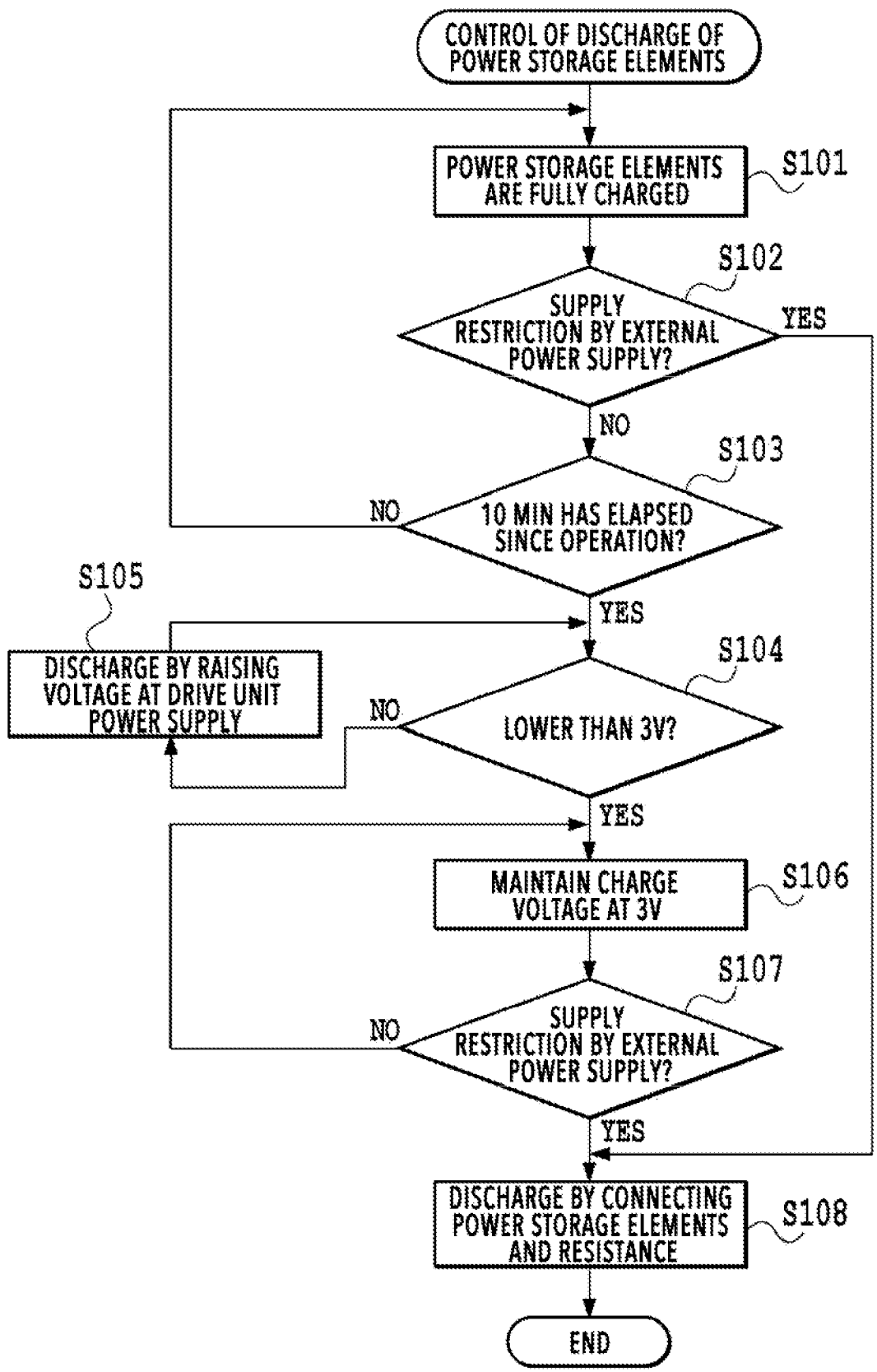
FIG. 3 is a diagram illustrating control of discharge of a power storage unit of the auxiliary power supply apparatus according to the embodiment of the technique of the present disclosure.

FIG. 3 is a flowchart illustrating the control of discharge of the power storage unit 13 of the auxiliary power supply apparatus 1, to which the technique of the present disclosure is applicable. The flowchart illustrated in FIG. 3 starts immediately after the completion of an operation of the drive unit 12.

In S101, the power storage unit 13 is confirmed to be holding a fully charged state. The operation then proceeds to S102.

In S102, the external power supply monitoring unit 116 detects data from the external interface and determines whether the external power supply is applying the current restriction. Specifically, the external power supply monitoring unit 116 determines whether packet polling is performed by the information processing apparatus 3 to determine whether the power supply state of the information processing apparatus 3 is in a suspend state. If the current restriction is not being applied (the information processing apparatus 3 is in an operating state), the operation proceeds to S103. If the current restriction is being applied, the operation proceeds to S108.

In S103, if a predetermined time, e.g., 10 minutes, have not elapsed since the completion of the operation of the drive unit 12 (the completion of drive), the operation returns to S101. If the predetermined time, e.g., 10 minutes, has elapsed since the completion of the operation of the drive unit 12, the operation proceeds to S104.

In S104, a process of detecting the voltage at the power storage unit 13 is performed as preprocessing for the discharge control. If the result of the voltage detection process is such that the voltage at the power storage unit 13 is 3 V or higher, the operation proceeds to S105. If the voltage at the power storage unit 13 is lower than 3 V, the operation proceeds to S106.

In S105, the first discharge control is performed. Specifically, the voltage at the drive unit power supply 1132 is raised to discharge the power storage unit 13. In the discharge in S105, the power storage unit 13 is discharged toward 3 V as a target voltage. After the first discharge control, the operation proceeds to S104. If the voltage at the power storage unit 13 is determined to be lower than 3 V in S104, the operation proceeds to S106.

In S106, after the power storage unit 13 is discharged, the charge voltage for the power storage unit 13, which is 3 V, is maintained, and the operation proceeds to S107.

In S107, the external power supply monitoring unit 116 detects data from the external interface and determines whether the external power supply is applying the current restriction. In this determination, as in S102, the external power supply monitoring unit 116 determines whether packet polling is performed by the information processing apparatus 3 to determine whether the power supply state of the information processing apparatus 3 is a suspend state, for example. If the current restriction is not being applied, the operation proceeds to S106. If the current restriction is being applied, the operation proceeds to S108.

In S108, the second discharge control is performed. Specifically, the power storage unit 13 is connected to a resistance and discharged through the resistance. In the discharge in S108, the power storage unit 13 is discharged toward 0 V as a target voltage, which is lower than 3 V. The operation is then completed.

In the present embodiment, the discharge of the power storage unit is controlled with the state of power supply equipment taken into consideration. This suppresses deterioration in power storage performance of the power storage unit. Also, in the first discharge control, the power storage unit is discharged not to 0 V but to a predetermined charge voltage setting value (3 V). Accordingly, the power storage unit recovers quickly. Further, in the case where the power supply equipment is put into a suspend state, the second discharge control is performed, in which the power storage unit is discharged to an even smaller voltage value. This further suppresses deterioration in power storage performance of the power storage unit.

Other Embodiments

Note that the technique of the present disclosure is not limited to the above embodiment. For example, the technique of the present disclosure may be an image reading apparatus or an image forming apparatus that obtains motive power with an auxiliary power supply based on the technique of the present disclosure. Further, the technique of the present disclosure is not limited to apparatuses but may be a method of controlling an auxiliary power supply comprising units in these apparatuses.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to perform discharge control that suppresses deterioration in power storage performance of a power storage component by taking the power supply state of power supply equipment into consideration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-145418, filed Aug. 1, 2018, and No. 2019-062884 filed Mar. 28, 2019 which are hereby incorporated by reference wherein in their entirety.

What is claimed is:

1. A power supply apparatus comprising:
   a power storage unit configured to store electric charges supplied from an external power supply;
   a control unit configured to control charge and discharge of the power storage unit;
   a state determination unit configured to determine a power supply state of the external power supply; and
   a voltage detection unit configured to detect voltage at the power storage unit,
   wherein the control unit performs first discharge control to lower the voltage at the power storage unit, which has a first voltage value, to a second voltage value smaller than the first voltage value in a case where a predetermined time elapses since completion of drive of a drive unit configured to be driven with power supplied from the power supply apparatus and the state determination unit determines that the power supply state is not a state of restricting power to be supplied.

2. The power supply apparatus according to claim 1, wherein the control unit performs second discharge control to further lower the voltage at the power storage unit from the second voltage value in a case where the state determination unit determines that the power supply state is the state of restricting the power to be supplied.

3. The power supply apparatus according to claim 1, wherein
   the power storage unit includes a plurality of power storage elements,
   the voltage detection unit detects voltage at each of the plurality of power storage elements, and
   the control unit controls the voltages at the plurality of power storage elements to make the voltages equal to each other.

4. The power supply apparatus according to claim 1, wherein the control unit measures the predetermined time by calculation from a clock value of a system clock of the power supply apparatus.

5. The power supply apparatus according to claim 1, wherein the voltage at the power storage unit is lowered to the second voltage value in a state where the drive unit is not being driven.

6. The power supply apparatus according to claim 1, wherein
   the power storage unit includes a plurality of power storage elements, and
   in the first discharge control, the control unit controls the discharge of the power storage unit such that voltage applied to each of the plurality of power storage elements does not exceed rated voltage of the power storage element.

7. The power supply apparatus according to claim 1, wherein in the first discharge control, the control unit generates voltage for the drive unit by connecting the power storage unit and a power supply for the drive unit, to thereby control the voltage value of the power storage unit such that the voltage value drops to the second voltage value due to a loss caused by the voltage generation.

8. The power supply apparatus according to claim 1, wherein the external power supply is USB bus power supplied through a USB cable.

9. The power supply apparatus according to claim 8, wherein the state determination unit determines the power supply state of the external power supply from a signal through the USB cable.

10. The power supply apparatus according to claim 2, wherein in the second discharge control, the control unit connects the power storage unit to a resistance component and discharges the power storage unit.

11. An image reading apparatus comprising:
    the power supply apparatus and the drive unit according to claim 1; and
    an image reading sensor configured to be driven by the drive unit.

12. A method of controlling a power supply apparatus comprising a power storage unit configured to store electric charges supplied from an external power supply, and a voltage detection unit configured to detect voltage at the power storage unit, the method comprising:
    determining a power supply state of the external power supply; and
    performing discharge control to lower the voltage at the power storage unit, which has a first voltage value, to a second voltage value smaller than the first voltage value in a case where a predetermined time elapses since completion of drive of a drive unit configured to be driven with power supplied from the power supply apparatus and it is determined that the power supply state is not a state of restricting power to be supplied.

* * * * *